Patented Sept. 23, 1924.

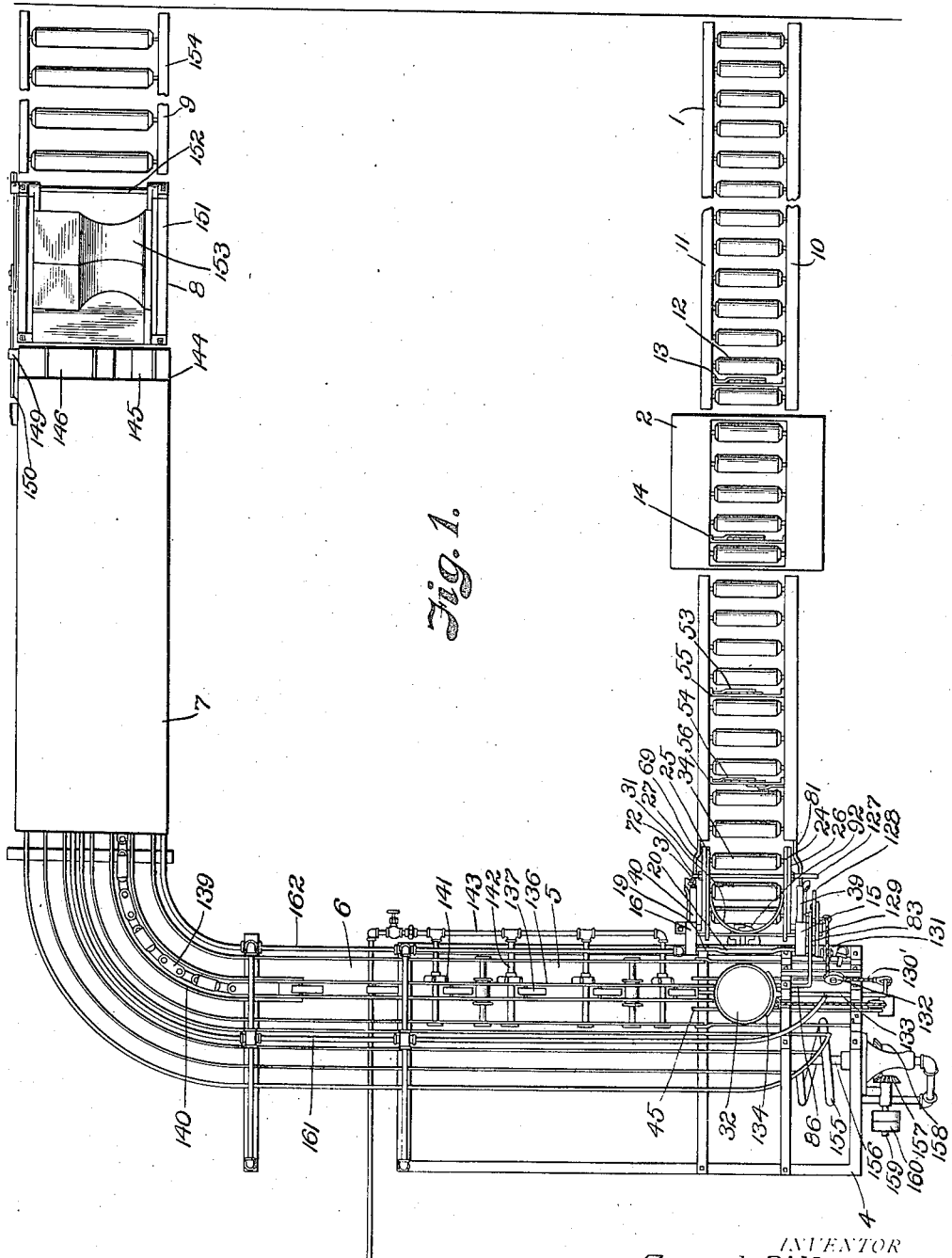

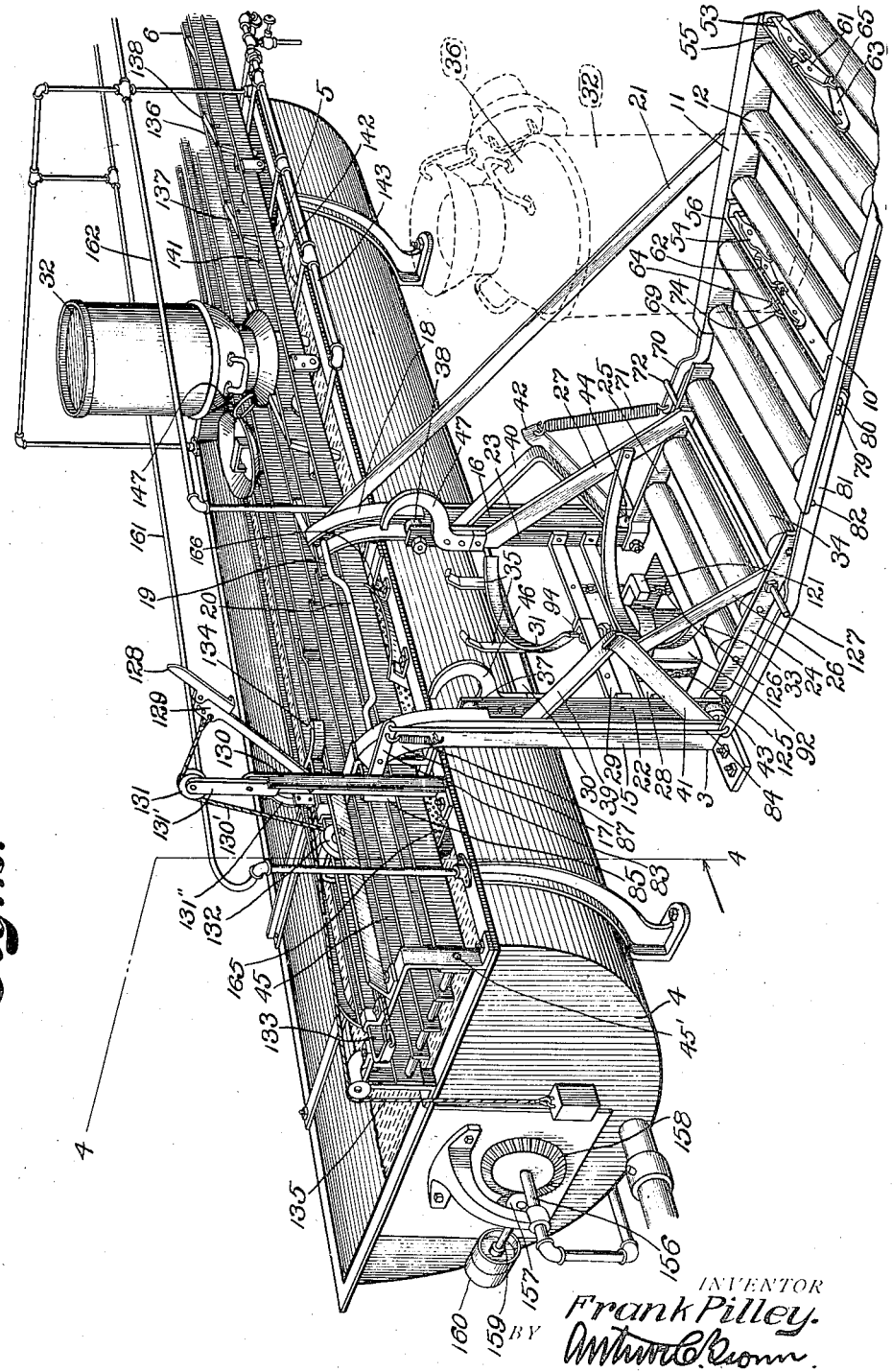

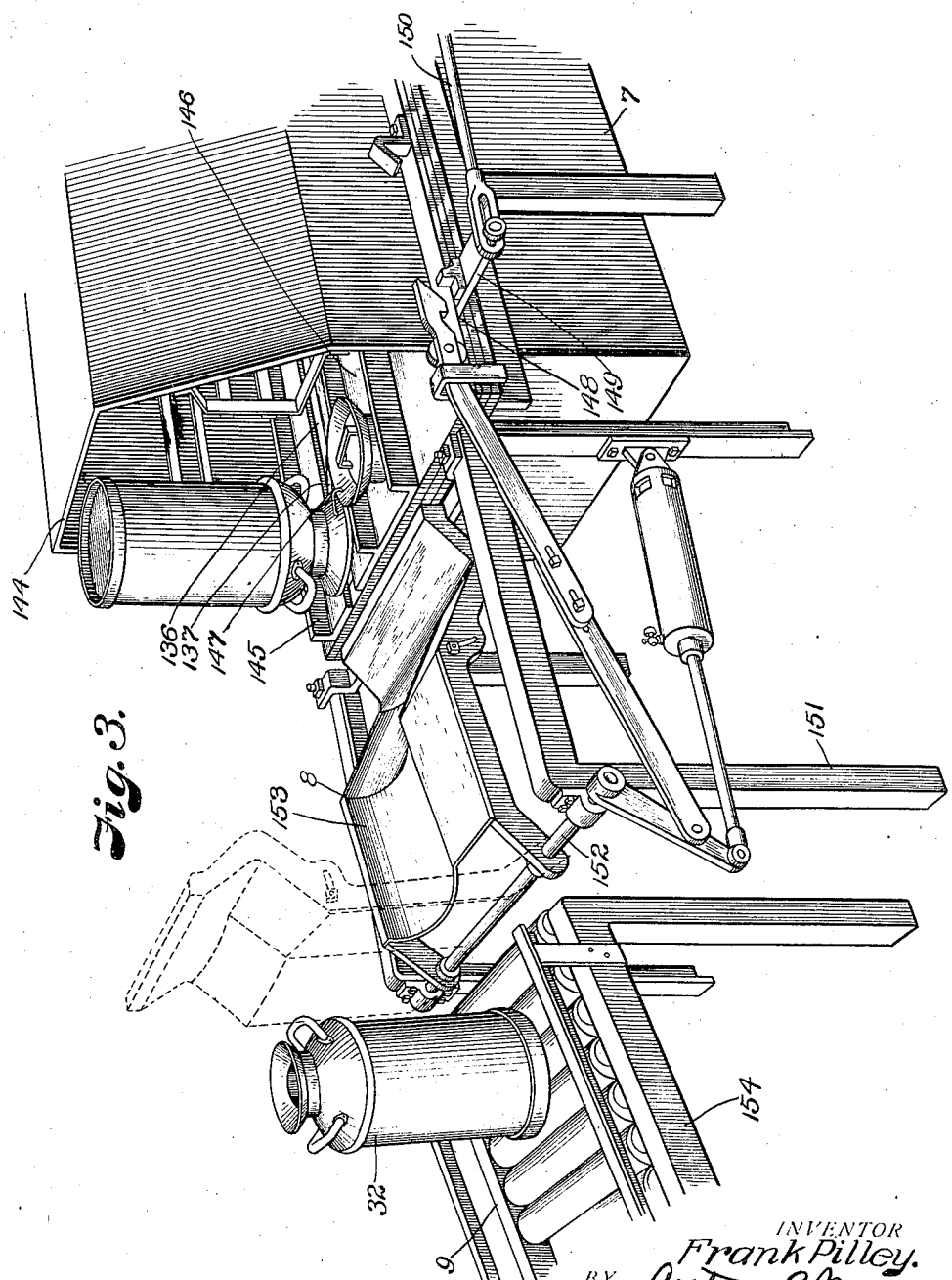

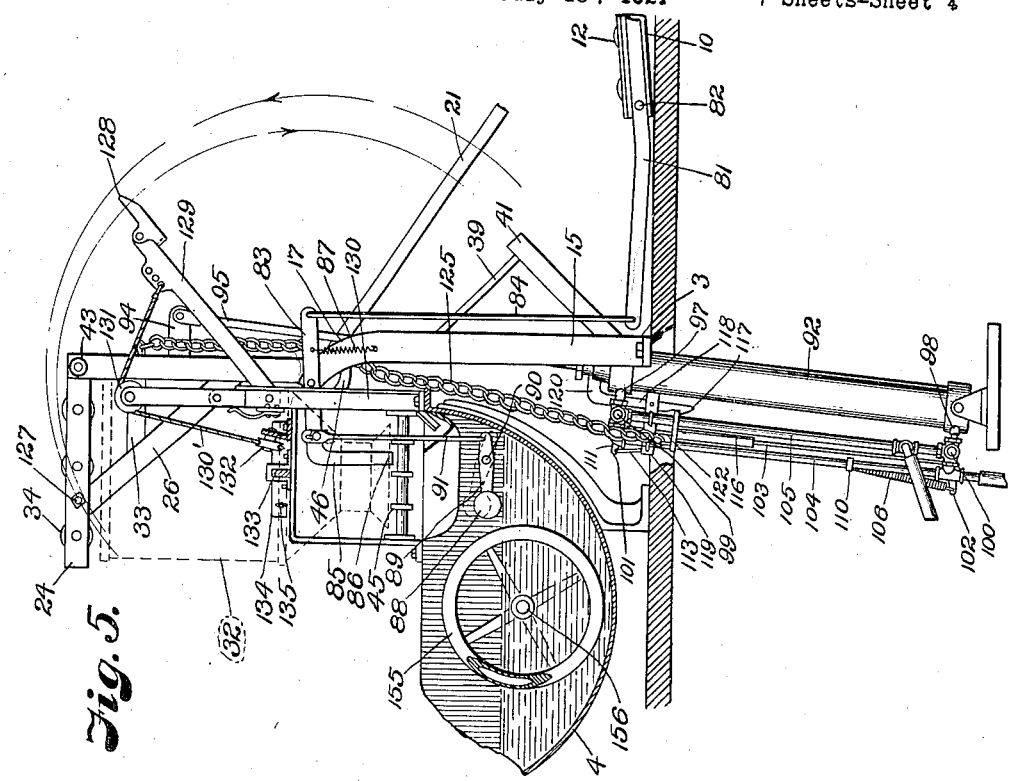

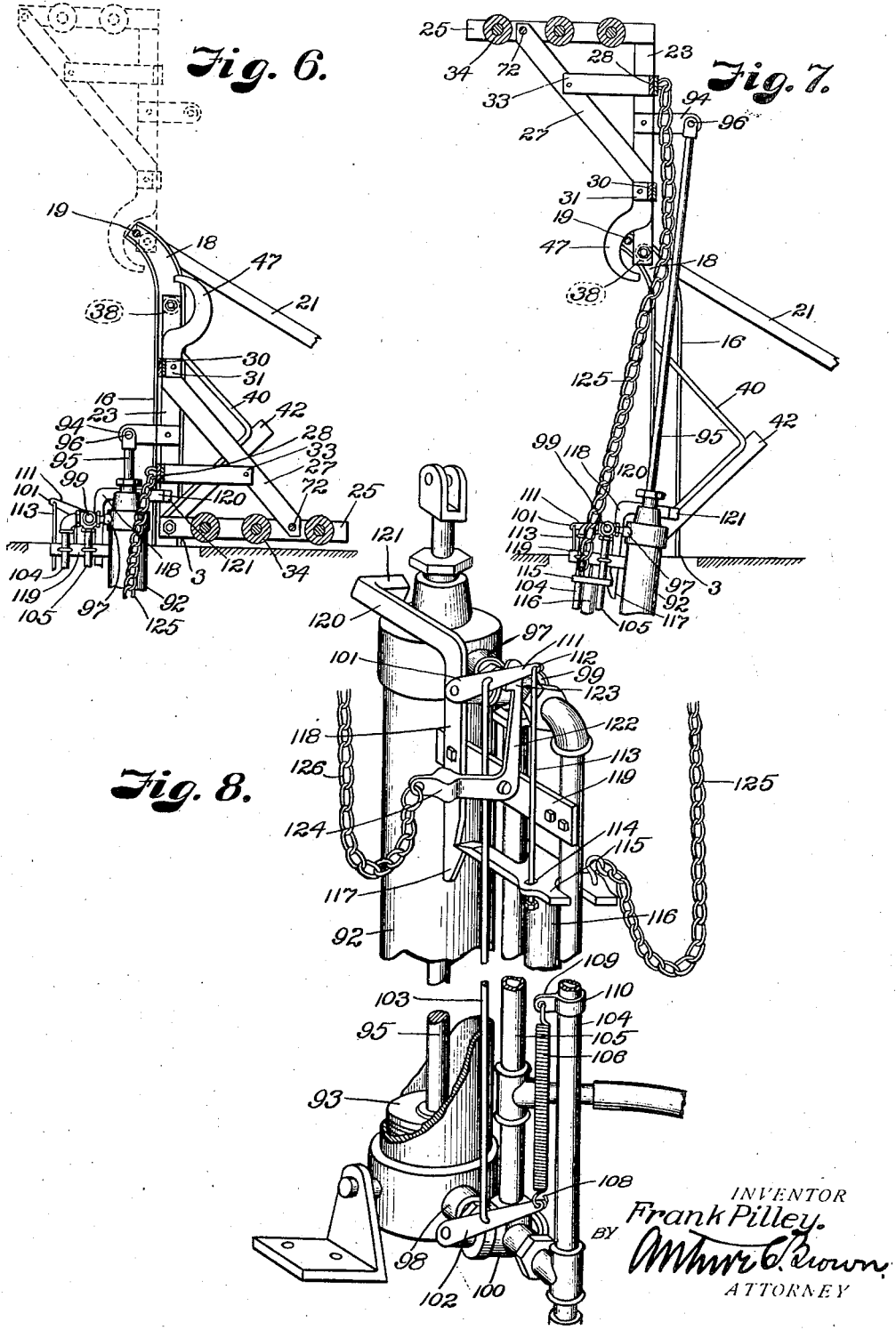

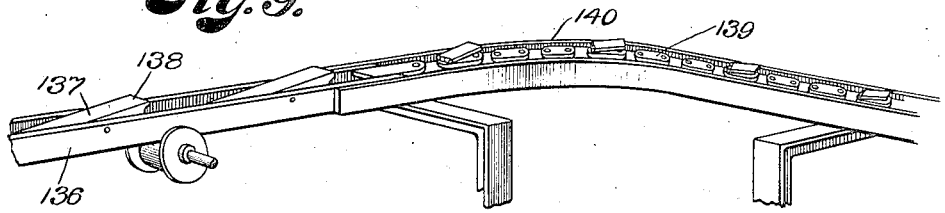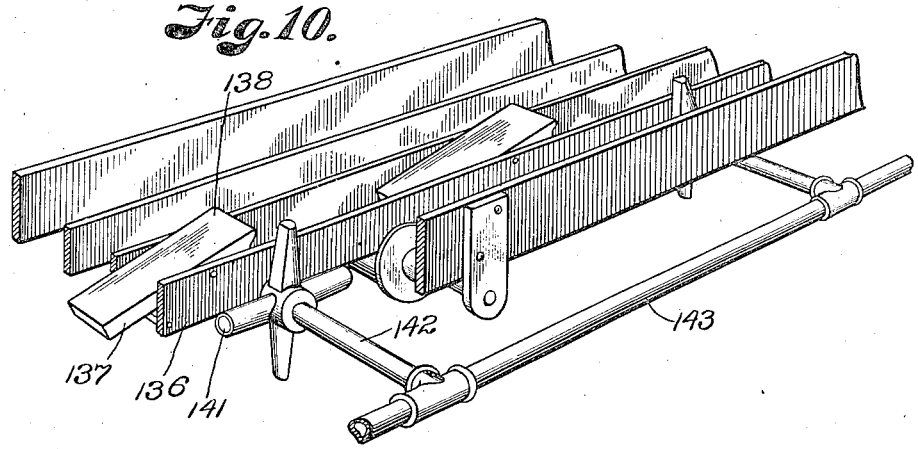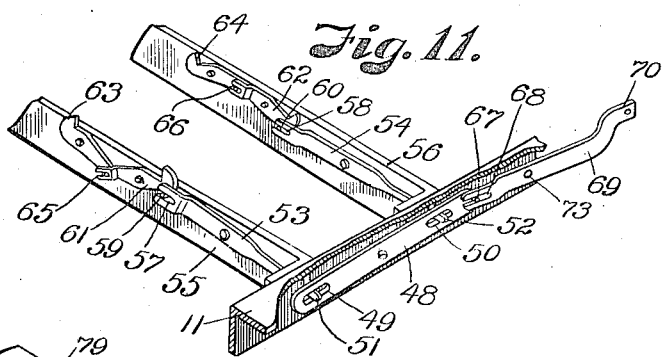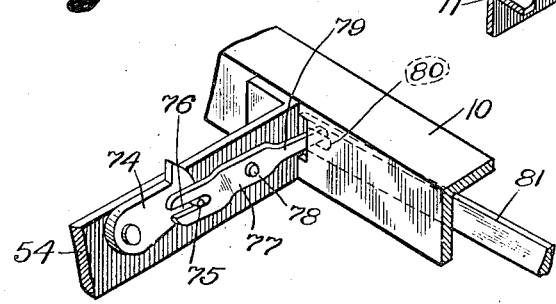

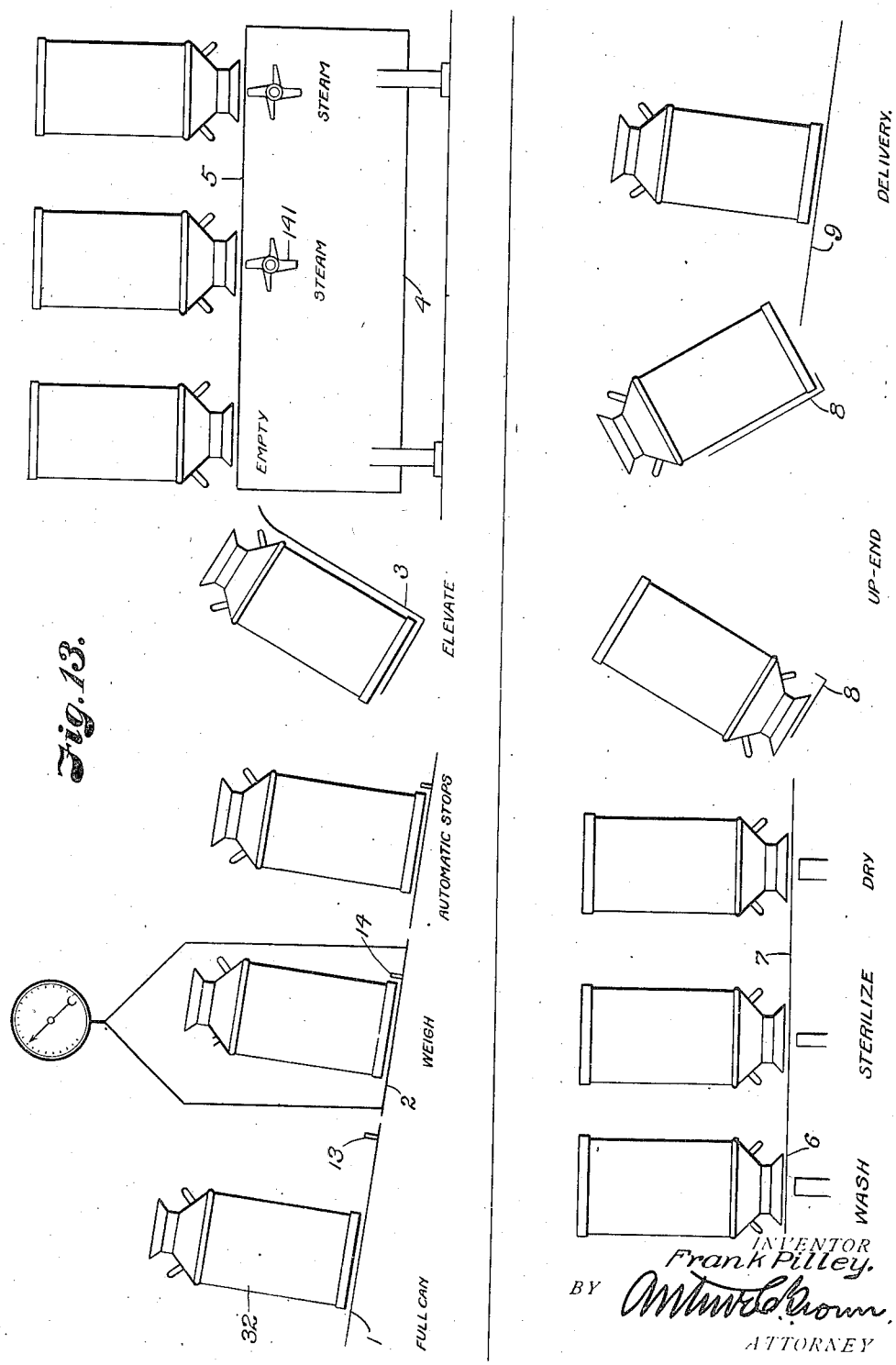

1,509,254

UNITED STATES PATENT OFFICE.

FRANK PILLEY, OF KANSAS CITY, MISSOURI

CAN-HANDLING APPARATUS.

Application filed July 15, 1921. Serial No. 484,842.

*To all whom it may concern:*

Be it known that I, FRANK PILLEY, a citizen of the United States, residing at Kansas City, in the county of Jackson and State of Missouri, have invented certain new and useful Improvements in Can-Handling Apparatus; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to an apparatus for handling dairy cans and the invention is primarily intended to provide means whereby a can of milk or cream can be introduced at the receiving end of the apparatus to be automatically conveyed to a mixing vat where the contents of the can will be mechanically dumped into the mixing vat and the can then passed in inverted position to a can cleaning mechanism, then to a can washer, and after leaving the can washer, to a can up-ending mechanism, from which it will be passed to a conveyor or runway to be deposited at the other end of the apparatus, preferably conveniently arranged adjacent to the inlet so that the cans may be taken from the cars filled with cream or milk, passed through the various steps of the apparatus to discharge the contents, clean and up-end the can and be deposited at a point adjacent to the car so that the empty cans can be re-shipped to the original shipper with a minimum loss of time.

It is to be understood that the various steps of handling the can from the time it is introduced to the receiving end of the apparatus until the time it passes off the discharge will be entirely automatic and mechanical, requiring no special personal attention on the part of operators other than that required to observe the general proper functioning of the apparatus.

I am aware that heretofore mechanical means has been provided for up-ending cans and for sterilizing them and washing them; but I am not aware that any one, prior to my invention, has arranged means for continuously and progressively feeding cans from the receiving end of any apparatus to the discharging end thereof so that the various steps of dumping, steaming, cleaning, up-ending and re-delivering the can in unbroken continuity.

The peculiarly novel arrangement of my apparatus, together with such novel details of construction as assist in carrying out the purpose thereof will be apparent by reference to the following description in connection with the accompanying drawings, in which—

Fig. 1 is a top plan view of an apparatus constructed in accordance with my invention.

Fig. 2 is an enlarged perspective view of the can emptying apparatus, the liquid mixing tank and part of the conveyor for causing the cans to move from the emptying mechanism to the can steaming and washing mechanism.

Fig. 3 is a perspective view of the discharge end of the can washing machine and of the can up-ending machine and part of the delivery conveyor.

Fig. 4 is a sectional view on the line 4—4 of Fig. 2, showing the can on the elevator of the can emptying mechanism.

Fig. 5 is a similar view showing the can elevated to dumping position.

Fig. 6 is a detail view of the can elevator in its normal position.

Fig. 7 is a similar view of the elevator in its dumping position.

Fig. 8 is a fragmentary perspective view of the motor or elevating mechanism for the can dumping elevator.

Fig. 9 is a sectional view of the track or conveyor between the mixing vat and the can washing machine.

Fig. 10 is an enlarged perspective view of a portion of said conveyor.

Fig. 11 is a fragmentary perspective view of an intermittently operating check or feed controlling device for the cans entering the elevator, Fig. 12 is a fragmentary, perspective view of an intermittently operating check or detent for controlling the feed of the cans to the carriage or elevator, and Fig. 13 is a diagrammatic view showing the various positions of the cans through the various progressive steps of the cycle of operations.

Referring now to the drawings by numerals of reference:

1 designates the receiving conveyor and 2 a scales platform upon which the cans may be weighed and interposed between the receiving and discharging end of the conveyor 1, but in the path of the cans as they move over it. 3 is a can emptying mechanism. 4 is a mixing vat for mixing the various grades and consistencies of cream so as to provide a uniform produce. 5 is the can steaming section to admit steam into the can so as to dislodge any particles of cream or milk adhering to the can and allow them to drop into the vat. 6 is a runway or conveyor to permit the can to gravitate from the vat to the can washing machine 7. 8 is the can-upending machine, and 9 is a return discharge conveyor for discharging the cans after they have been dumped and cleaned.

The conveyor or runway 1 is shown as consisting of two side rails 10 and 11, in which are journaled rollers 12, and the runway extends from the receiving end to a point adjacent to the vat 4 and interposed between the respective ends in a scale platform 2, which may or may not be a part of the apparatus. If it is used, however, it is serviceable in weighing the cans so as to determine that the quantity of milk or cream invoiced is in the can and so that the shipper may get proper credit for his material.

If this scale is included as part of the apparatus I may employ barriers 13 and 14, one in front of the scale platform and the other across the scale platform so that one can or a group of cans for a particular shipper may be fed onto the platform and weighed while the other cans are held back.

After the cans leave the weighing platform they may pass onto the can emptying mechanism 3, by means of which the contents of the cans are emptied into the vat 4, it being customary in dairies and the like to deliver milk or cream from a number of cans into a vat and mix the various contents together so as to provide a uniform grade of milk or cream. The can emptying mechanism is best shown in Figs. 2, 4, 5, 6, 7, 8, 11 and 12.

Two standards 15 and 16 are provided adjacent to the mixing vat 4 and they are provided at their upper ends with laterally curved, channel-shaped guides 17 and 18, the upper extremities of which are connected by a fulcrum rod or rest 19 having an offset portion 20 against which the neck or constricted portion of the can may rest as it is being inverted by the carriage, as will be apparent hereinafter.

One or both of the standards 15 and 16 may be braced by one or more diagonal braces 21, if desired.

The carriage is adapted to float in the guides when moved to either its dumping position or back to its receiving position because there is no fixed point about which the carriage moves.

The form of carriage illustrated in the drawings consists of a skeleton back wall comprising uprights or verticals 22 and 23 supporting the floor or horizontal side bars 24 and 25 so that a substantially triangular frame is provided. The transverse or horizontal floor bars 24 and 25 are connected to the verticals by the diagonal braces 26 and 27. The verticals are connected by the horizontal bars 28, 29 and 30, it being obvious that any number of transverse bars may be provided to make the carriage sufficiently rigid.

The bar 30 supports a curved strap 31, which constitutes a seat or saddle against which the upper portion of the can 32 may rest, the circumferential or body portion of the can 32 being also adapted to be received by a semi-circular strap or saddle 33 carried by the diagonal braces 26 and 27 so that when the can is received upon the rollers 34, journaled in the floor bars 24 and 25, it will be held against movement so that it can be swung with the carriage into dumping position, there being stabilizing, upstanding fingers 35 extending from the bar 30 to fit over the rim of the conical breast portion 36 of the can 32, as will be apparent by reference to Fig. 2. The carriage is capable of having an upwardly swinging movement imparted to it by a suitable motor or elevator, the movement of the carriage being responsive to certain guiding mechanism which I will now proceed to describe.

At the upper ends of the verticals 22 and 23 are rollers 37 and 38 which ride in the channel guides 17 and 18 of the uprights 15 and 16. The uprights 15 and 16 carry triangular guide bars 39 and 40, the angles of which extend in the direction of the receiving end of the floor of the carriage and the lower guide bar members of the guides 39 and 40 are provided with guides 41 and 42 to maintain the lower rollers 43 and 44 on the verticals 22 and 23 in contact with the lower rails of the triangular guides so that when the carriage is raised in the guideways 17 and 18, the rollers 41 and 42 will ride on the bottom rails of the triangular guides to swing the bottom or floor of the carriage upwardly and laterally to an inverted position, as shown in Fig. 5, thereby inverting the can so as to discharge its contents into the mixing vat 4. The can, at this time, is resting upon the horizontal guide rails 45 which constitute a grid over the mixing vat and also serve as skids or runways so that the can may slide from left to right after the contents have been discharged and be conveyed to the can steaming or sterilizing mechanism 5. The rod 19 which constitutes a tie rod for the uprights 17 and 18 is offset at 20 to clear the can as the carriage moves into dumping position, enabling the can to readily reverse from normal to dumping position without contacting with the rod 19.

By reference to Fig. 2 it will be observed that the verticals 22 and 23 carry hook-shaped members 46 and 47, which are adapted to swing about the axes of the ends of the rod 19 and when the carriage is in its dumping position, as shown in Fig. 5, the hooks may abut against the end portions of the rod which then constitute stops to stabilize the carriage as the can is discharging its contents into the vat 4.

There is means provided for controlling the feed of the cans through the floor of the carriage and such means is controlled from the carriage. For example, in the vertical web of the angle side bar 11 is a centrally pivoted lever 48, having elongated slots 49 and 50 therein, which are engaged by the ends 51 and 52 of the levers 53 and 54 on the stringers 55 and 56 connected to the angle bars 10 and 11, as clearly indicated in Figs. 2 and 11.

The levers 53 and 54 have bifurcated ends 57 and 58, which engage the pins 59 and 60 on the pivoted dogs 61 and 62, the dogs 63 and 64 being connected to complementary pivoted dogs 61 and 62 by the pins 65 and 66 (see Fig. 11).

One end of the lever 48 is provided with a pin 67 engaged by the bifurcated end 68 of the pivoted lever 69 which has an offset portion 70 connected to the guard 42 by a spring 71. Across the top edge of the offset portion 70 of the lever 69 extends a tripping rod 72, carried by the floor bars 24 and 25 of the carriage. When the rod 72 bears upon the offset portion 70 of the lever 69, the offset portion will be depressed, swinging the bar 69 about its pivot 73, raising one end of the lever 48 and depressing the other. Therefore, when the rod 72 bears upon the end of the bar 70, the dogs 61 and 63 will retract below their stringers so as to allow a can to pass onto the carriage but the dog 62 and 64 will hold back the remaining cans until the carriage starts to move upwardly, when the dogs 62 and 64 will move below the upper edge of their stringers, allowing a can to pass toward the dogs 61 and 63 which will then be extended above their stringers to hold back the first can from passing onto the carriage until the carriage has gone back to the position shown in Fig. 2.

This alternating operation will be effective in feeding one can to position ready to move onto the carriage but the can will be held against moving onto the carriage until the carriage has completed its cycle of operation; that is, until it has moved to dumping position and back to can-receiving position.

It may be that under certain conditions the can-receiving carriage will have completed its cycle of operations and be ready to receive the can with the rod 72 resting upon the portion 70 of the bar or lever 69 before the can on the grid or rails 45 will have moved away. In such event, the advance of the can onto the carriage will be opposed by a can-controlled detent or dog 74 carried by the stringer 54 on the opposite side to that from which the dogs 62 and 64 are pivoted. The dog 74 is provided with a pin 75 engaged by the bifurcated end 76 of the lever 77, pivoted at 78 and having an end 79 projecting through the vertical web of the angle side bar 10, to be engaged by the slotted portion 80 of the bar 81, pivoted at 82 and extending to a point adjacent to the upright 15 where it is connected to a lever 83 by a link rod or wire 84. The lever 83 is pivoted to the top of the upright 15 and it has a depending arm 85 with a lateral can rest or engaging portion 86. Therefore, when the can is released onto the grid bars 45, its neck flange will rest on the portion 86 depressing one end of the arm 83 and raising the link 84 so that the dog 74 will be projected beyond the upper edge of the stringer 54; hence the can cannot move toward the carriage while another can is resting on the grid and depressing the arm 85. As soon as the can is removed from contact with the portion 86 of the arm 85, the tension spring 87 connected to the lever 83 and to the upright 15 will pull down on the lever 83 so that the link 84 will be moved downwardly, actuating the bar 81 to raise the slotted end 80 thereof, raising the outer end of the lever 77, depressing the bifurcated end 76 thereof and withdrawing the projecting end of the dog 74 below the top edge of the stringer 54. Then the can previously released by the dogs 62 and 64 can pass onto the carriage, ready to be raised again in the cycle of operations.

These movements can take place provided the level of the liquid in the tank 4 has not risen high enough to actuate the float 88, which is connected to a lever 89 pivoted at 90 and having one end connected to the arm 83 by the link 91. If the level of the liquid in the tank 4 does raise the float 88, the link 91 will be caused to pull down on the lever 83 in substantially the same way as the lever would be actuated if a can rested on 86. Then the dog 74 will project above the springer 54 and prevent movement of the can until the level in the tank 4 recedes sufficiently to allow the float 88 to drop enough to permit the spring 87 to withdraw the dog 74 through the link connections above described.

The elevator for the carriage is shown as a hydraulic motor consisting of a cylinder 92 and a piston 93. The piston 93 is connected to a bracket 94 on the back frame of the carriage by a piston rod 95, through the medium of a pivot 96. Therefore, when the piston is raised, the carriage will be elevated to swing about the axis of the rollers 37 and 38 and at the same time have a floating engagement with the guides so that it can raise and swing at the same time until the carriage assumes the position shown in Fig. 5, at which time the can can be inverted, as indicated in the figure to discharge its contents.

The specific form of motor illustrated is best shown in Figs. 4, 5 and 8 as consisting, besides the cylinder 92 and the piston 93, of certain controlling mechanism. The cylinder 92 has ports 97 and 98 adapted to alternately become inlet and outlet exhaust ports, there being three-way valves 99 and 100 for the ports 97 and 98, which are connected together through the medium of the crank arms 101 and 102 by the link 103, the ports being so arranged that when one is exhausting the other is supplying fluid. The fluid may be supplied through a manifold 104 to either port and the valves alternately exhaust into the exhaust pipe 105, as will be apparent by reference to Fig. 8.

The lever arm 102 is connected to the inlet manifold 104 through the medium of a spring 106, one end 108 being connected to the arm 102 and the other end connected to the lug 109 forming part of the band 110 so that the normal tendency is to maintain one valve closed and the other open. The end 111 of the lever 101 is connected to a weight for overcoming the spring. The opening 112 in the end 111 of the lever 101 receives an anchoring weight support 113 which loosely projects through an opening 114 in the head 115 of the weight 116, the weight being normally held against movement by the detent hook 117 on the pivot lever 118 carried by the bracket bars 119 supported by the pipes 104 and 105. The detent lever 118 has a transversely disposed arm 120 with a right angular can-engaging projection 121, which is positioned to extend slightly in advance of the back end of the carriage, as will be clearly seen by reference to Fig. 2.

The bracket arm 119 supports a pivot elbow-shaped latch 122, which has a detent hook 123 adapted to move over the upper edge of the arm 101 when the arm has moved low enough and it will normally be held in engagement with the weighted end 124 of the latch 122. Therefore, when the parts are in proper position and the can moves onto the carriage, its perimeter will strike against the arm 121, moving the detent latch 117 out of engagement with the head 115 and since the weight 116 preponderates over the tension of the spring 106, it will be apparent that the weight will drop, imparting a downward movement to the arm 101 of the valve 99 and a similar movement to the arm 102 of the valve 98, the synchronizing movements responding to the connection 103 between the two levers. Such movement will result in the lower end of the cylinder below the piston 93 being in communication with the pipe 104 and the upper end of the cylinder on the top side of the piston being in communication with the pipe 105; therefore, liquid will enter the lower portion of the cylinder to raise the piston and it, in turn, will swing the carriage to the position shown in Fig. 5. During the upward movement of the carriage, the weight will be restored to the position shown in Fig. 8 by the flexible connection shown as a chain 125, which has one end connected to the head 115 and the other to the bar 28 of the carriage so that when the chain 125 becomes taut, the upward pull induced by the carriage will raise the weight to the position shown in Fig. 8 and since the can is in raised position, as shown in Fig. 5, and out of contact with the arm 121, it will be apparent that the detent 117 will engage under the head 115 to hold the weight in its raised position at the final upward movement of the carriage and a flexible connection or chain 126, having one end secured to the carriage will pull upwardly on the weighted end 124 of the elbow-shaped detent 122 so as to release the detent 123 from engagement with the lever 101. Then the valve 99 will effect communication between the pipe 104 and the upper end of the cylinder 92 on top of the piston 93 and consequently, effect discharging communication between the lower end of the cylinder 92 and the drain pipe or exhaust 105 so that the hydraulic pressure will be from the top of the piston to move the piston downwardly and swing the carriage back to can-receiving position; for example, as shown in Figs. 2 and 4.

When the carriage has gone back to its position as shown in Figs. 2 and 4, obviously the rod 72, bearing down on 70 will retract the dogs 62 and 64, to allow the can held to be slid onto the floor of the carriage. However, if the can which has just been inverted on the grids 39 is not out of its dumping position, that is, if it has not moved away from the position in which it was dumping, it will still be bearing on the arm 86 and through its connection with the dog or detent 74, will have the toe of the detent raised above the stringer 54 so that the can cannot move onto the carriage until a previously dumped can has moved off the grid or has been taken away therefrom. Just as soon as it has, however, the can moving on the floor of the carriage will come in contact with the lateral arm 121 and set the motor in operation again so that the carriage will swing outwardly and upwardly, tilting the can in inverted position to dump the contents into the vat.

When the carriage moves to its vertical or dumping position, the end 127 on the rod 72 will contact with the free end of the pivoted finger 128, carried on the arm 129 pivoted to the standard 130. The construction of the finger 128 is such that the end 127 will ride over the free end on account of the pivot connection of the finger 128 with the arm 129. When the carriage moves back to its can-receiving position, as shown in Fig. 2, the end 127 will ride over the edge thereof and since the finger 128 has a rule joint connection with the arm 129, the arm will be drawn downwardly, pulling on the flexible connection 130', passing over the pulley 131 and over the fixed pulley 132 carried by the grid, the end of the connection 130 being secured to a slide 133 mounted in the grid and having a pusher 134 at one end thereof to force the can away from the dumping mechanism toward certain steaming mechanism to then act on the can. When the pusher 134 has acted and the end 127 moves off 128, the arm 129 will be retracted by the weighted flexible connection 135 to be out of the way of the next can passing onto the grid.

The above described mechanism is provided to positively remove the cans from the path of the carriage in case the regular forwarding means presently described does not function quick enough, as it is not necessary to have the two units operate in synchronism and any slight congestion that might occur is compensated for in the flexible arm 131' which is pivoted to the standard 130 and held yieldingly in upright position by a spring 131" so that when the carriage descends and the pusher 134 is obstructed by cans for any reason whatsoever, there will be no breakage when the rod 127 strikes the finger 128 on account of the yieldable arm 131' which automatically furnishes slack for the connection 130' and permits the carriage to pass.

On the runway or tract sections 6, which connect the grid over the vat with the can washing machine 7 is a longitudinally slidable channel 136 having pivoted dogs 137 mounted between the flanges thereof, one end of each dog being heavier than the other so as to normally have a toe portion 138 in position to engage the cans to move them forward but to allow the cans to ride over the toe portions by depressing them in the channels, as will be well understood by reference to Figs. 9 and 10.

The intermittent reciprocation of the can actuator or channel 136 is caused by an appropriate working part within the can washing machine 7 to which the actuator 136 is connected by the flexible connection 139 consisting of the links in narrow guides so that they may make the turn at 140 but will not swing on their pivotal connections enough to destroy their power to reciprocate the actuator channel 136 on its recovery stroke or to its retractive position. Thus the back and forth movement of the channel 136 will move the cans along toward the washing machine.

As they pass over the guide or track portion 6, however, they will ride over the pivoted nozzles 141, radially disposed about the pipe 142 which feeds them, their construction being similar to that shown in my Patent No. 1,299,507 of April 8, 1919, so it is thought that it will be unnecessary to specifically describe the nozzles and the manifold 143 with its connections in this application. Suffice it to say that as the cans move over the conveyor section 6, they will turn the nozzles 141 by the movement of the cans so that there will always be a nozzle introduced into the hollow portion of the can to admit steam to both sterilize the can and dislodge accumulated cream or butter-fat which may drop back into the vat 4. The cans, being substantially free from accumulated cream, are then passed on by the actuator of the conveyor portion 6 into the washing machine 7, which may be of appropriate construction and which will wash the cans in the usual way in inverted position and pass them to the delivery end 144 of the can washing machine.

The can washing machine is shown as provided with a can guideway 145 and a can top guideway 146, the tops being shown as secured to the cans by coupling wires 147. In the side of the can cleaning machine is a slot 148, in which is mounted an oscillatory bar 149, pivoted at one end and engaged at the other end by a reciprocatory pitman 150, which may be driven by any suitable power. The bar 149 extends transversely of the machine and swings to and fro under the action of the pitman to eject the cans and their covers and said bar may be secured to the links 139 to actuate the actuator 136.

The mechanism of the can washing machine as heretofore explained per se constitutes no part of the invention as such can washing machines are well known in the art.

Interposed between the end of the can washing machine and the runway 9 is a can-up-ending mechanism including a supporting frame 151, at the rear of which is journaled a rock shaft 152, carrying a swinging cradle or basket 153 and operated in substantially the same manner as disclosed in my Patent No. 1,366,933 of February 1, 1921 so that the cans may be deposited from the can washing machine onto the discharge conveyor or gravity runway 154. By arranging the apparatus in the form of a horseshoe the cans can be fed at one end and be discharged at the discharge end of the machine adjacent to the receiving end so that the cans may be conveniently observed and handled by an operator or operators working between the two ends of the apparatus and within easy reach of either end of the apparatus.

The specific construction of the vat may be varied but the rotating agitator 155 is shown as mounted on a shaft 156 and driven through the medium of the gears 157 and 158 from the shaft 159, which carries the power pulley 160.

Suitable superstructure may be provided, for example, side guard rails 161 and 162, as shown in Fig. 2.

It will be apparent from the foregoing that the cans containing cream or milk may be introduced at one end of the machine and automatically be fed to the vat or condensing trough where they may be automatically lifted and the contents dumped into the vat or trough, the motor being under the control of the cans and that the cans may be mechanically removed from the vat to the steaming apparatus and from there to the washing machine where they will pass through a can-up-ending mechanism which will automatically turn them end up and pass them onto a discharge conveyor, the entire cycle of operation being mechanically controlled, one mechanism being modified or controlled by the other so the necessity for attendants will be materially reduced.

The apparatus described in this application is a material advance in the dairying industry since the operation of the parts of the machine is positive and insures proper timing movement and accuracy of feed for the cans through the various stages during the cycle of operations of the machine. The apparatus materially enhances the handling of the cans and insures their being properly sterilized, cleaned and returned for re-shipping back to the shipper, the various steps in the cycle of operations following in their proper sequence and their continuity of movements under the control of the mechanism co-ordinating to produce the desired result.

It is to be understood that the steam nozzles adjacent to the mixing vat direct steam into the interior of the can to dislodge particles of butterfat which may be adhering to the can and which will not become dislodged when the can is dumped. Then as the can passes onto the washing machine, it is thoroughly washed, sterilized and dried before it leaves the up-ending machine.

There are a number of machines available for this purpose, all of which wash, sterilize and dry the cans and this operation is so well understood that it is considered unnecessary to enter into a detailed description of the particular type of washing machine employed.

I may include certain sanitary features such as hinging the grid 45 at 45' so that it may be swung out of the way for cleaning and sterilizing the strainer 165 which lies immediately beneath the grid and prevents any foreign matter in the cream or which may adhere to the outside of the can and become loosened in the emptying operation from entering the cream vat 4. An apron 166 at one side of the strainer prevents cream from splashing out as the can is emptied.

What I claim and desire to secure by Letters Patent is:

1. In an apparatus for handling milk cans, a receiving conveyor, a mixing vat, in line with the receiving conveyor, a can emptying mechanism between the conveyor and the mixing vat onto which the can is delivered by the conveyor, the can emptying mechanism having means for lifting the can to a point above the mixing vat, a conveyor to receive the can in inverted position above the mixing vat, means for transferring the can from the lifting mechanism to the second mentioned conveyor, a can washing apparatus through which the can is automatically passed and a can-up-ending mechanism at the end of the washing apparatus onto which the can is automatically delivered after it passes from the washing apparatus and a delivering mechanism receiving the can from the up-ending mechanism.

2. In an apparatus for handling milk cans, a receiving conveyor, a mixing vat, in line with the receiving conveyor, a can emptying mechanism between the conveyor and the mixing vat onto which the can is delivered by the conveyor, the can emptying mechanism having means for lifting the can to a point above the mixing vat, a conveyor to receive the can in inverted position above the mixing vat, means for transferring the can from the lifting mechanism to the second mentioned conveyor, a can washing apparatus through which the can is automatically passed and a can-up-ending mechanism at the end of the washing apparatus onto which the can is automatically delivered after it passes from the washing apparatus and a delivering mechanism receiving the can from the up-ending mechanism, the whole being arranged in the form of a U-shaped structure so that the part of the apparatus receiving the can and the part delivering the can are in substantially lateral alignment.

3. In a milk can handling apparatus, a receiving conveyor, a can dumping mechanism in line with the conveyor, a mixing vat to receive the liquid from the dumped can, a can steaming mechanism, a conveyor for conveying the cans progressively past the steaming means, a can washing means, automatic means for receiving the cans and passing them to the washing means, a can-up-ending means automatically receiving the cans from the discharge end of the can washing means and a conveyor for receiving the up-ended cans.

4. An apparatus of the class described, comprising a receiving conveyor, a can dumping mechanism on to which the cans pass from the conveyor, a vat into which the contents of the cans are dumped by the up-ending mechanism, mechanical means for moving the cans from the vat, a steaming mechanism over which the inverted cans are mechanically passed, a washing mechanism into which the cans are transferred, a can-up-ending mechanism onto which the cans are mechanically discharged and a delivery conveyor onto which the cans are delivered from the up-ending mechanism.

5. A device of the class described comprising a substantially U-shaped structure including means for receiving the cans, means for dumping the cans, means for steaming the cans, means for washing the cans, means for up-ending the cans and means for delivering the cans in the order named.

In testimony whereof I affix my signature.

FRANK PILLEY.